Oct. 23, 1956 D. G. C. HARE 2,768,243

MAGNETIC SOUND REPRODUCER

Filed April 1, 1950 2 Sheets-Sheet 1

INVENTOR
DONALD G. C. HARE
BY
Norman C. Arterington
ATTORNEY

Oct. 23, 1956 D. G. C. HARE 2,768,243

MAGNETIC SOUND REPRODUCER

Filed April 1, 1950 2 Sheets-Sheet 2

INVENTOR
DONALD G. C. HARE
BY
ATTORNEY

United States Patent Office 2,768,243

Patented Oct. 23, 1956

2,768,243

MAGNETIC SOUND REPRODUCER

Donald G. C. Hare, Stamford, Conn., assignor to Magnetic Equipment, Inc., Greenwich, Conn., a corporation of Delaware Application April 1, 1950, Serial No. 153,472

4 Claims. (Cl. 179—100.2)

The present invention relates to magnetic devices and more particularly to magnetic sound transducing devices suitable for use in magnetic sound reproducing systems. In the usual type of magnetic sound systems a magnetic medium, such as a tape or wire of magnetic material or a layer or coating of magnetic material on a non-magnetic base, is magnetized by subjecting it to a magnetic field varying with the signal to be recorded, the medium moving relatively to the impressed field. During reproduction a transducing device, called a play-back or reproducing head, which ordinarily comprises a laminated core having a winding thereon, is positioned with its pole faces engaging the moving medium so as to have flux interlinkage therewith. During relative movement between the pick-up head and the magnetic medium, voltages induced in the coil of the play-back head vary with the rate of change of the magnetic flux linked with the head. Thus in the above briefly described conventional type of play-back head, as the intensity of the induced voltage depends upon the rate of change of the flux rather than upon the intensity of the flux, the response is not uniform throughout the frequency range but decreases as the frequency decreases. Equalizing circuits have been employed to give a more uniform response throughout the frequency range of the signal, but low frequency amplifiers used in such circuits introduce noise and increase the hum. At very low frequencies, "flicker effect" in the amplifiers is objectionable.

The reproducing circuit and play-back head of the invention yields a signal which is a function of the intensity of magnetization in the signal medium. The response is uniform over the low frequency range of the signal without sacrifice in the over all dynamic range. The new play-back head includes a saturable element of high permeability which forms part of the magnetic circuit linked with the signal medium. The element is subjected to a rapidly fluctuating symmetrical field of a peak amplitude sufficient, in the absence of signal flux, to bring the element to a non-linear portion of the magnetization curve. Due to the novel balanced construction of the play-back head the high frequency flux impressed upon the saturable element does not penetrate the magnetic signal medium and hence does not erase the signal. The reproducing circuit of the invention includes one or more detecting windings coupled to the element for induction therein of voltages of the frequency of the fluctuating field and of the second harmonic thereof, the intensity of the latter varying with the intensity of the signal flux. The circuit includes also means for converting the induced voltage into an output voltage varying in intensity with the intensity of the signal flux.

For a better understanding of the invention, reference may be had to the accompanying drawings of which:

Figure 1:
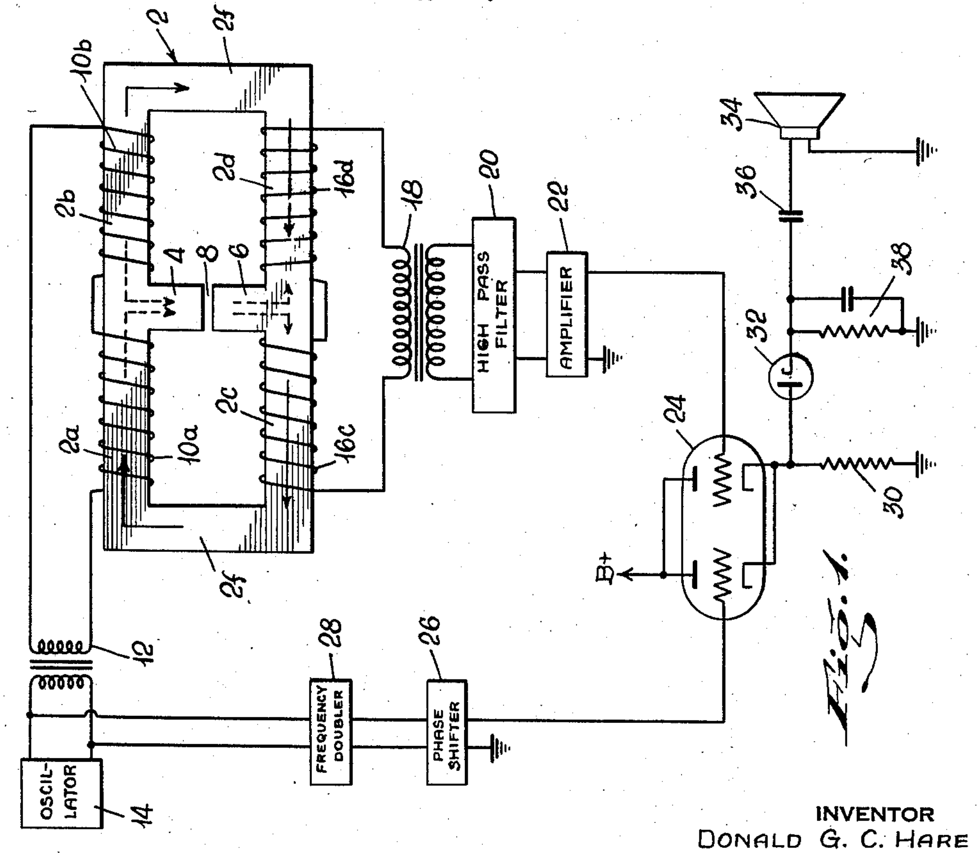
Fig. 1 is a diagram of a reproducing system representing one specific embodiment of the invention, the saturable element of the play-back head being shown as developed in plan and structural parts of the head being omitted in order to simplify the explanation of the system and to illustrate the magnetic paths in the element.

In Fig. 1 the saturable element of the play-back head is indicated diagrammatically at 2. For present purposes the element may be considered as comprising a thin sheet of metal of high permeability which is cut in the form of a rectangular frame with two medial reentrant portions 4 and 6 separated by a gap 8. The parts 4 and 6 and gap 8 provide the means for magnetically linking the element 2 with magnetic tape or the like as will be more fully described in connection with Fig. 2. On the upper branches 2*a* and 2*b* of the frame 2, at either side of the portion 4, are wound exciting coils 10*a* and 10*b* which are connected in series across the secondary of a transformer 12, the primary of which is connected to a suitable source 14 of high frequency oscillations. On the lower branches 2*c* and 2*d* of the frame, on the opposite sides of the portion 6, are wound detecting coils 16*c* and 16*d*. These coils are preferably of an equal number of turns and are wound oppositely about the branches 2*c* and 2*d*. The coils 16*c* and 16*d* are connected in series across the primary of a transformer 18.

The secondary of transformer 18 is connected through a high pass filter 20, which removes any fundamental frequency components appearing in the transformer output due to any inequality of the coils 16*c* and 16*d* and through a suitable amplifier 22 to one control grid of a double triode mixer tube 24. The other control grid of the mixer tube is connected through an adjustable phase shifter 26 and frequency doubler 28 to the oscillator 14. The cathodes of the mixer tube 24 are connected to ground through a resistor 30. A half wave rectifier 32 has its anode connected to the cathodes of the mixer 24 and its cathode connected to one input terminal of a reproducing device 34 such as a loud speaker or the like, the other terminal of the device 34 being grounded. A condenser 36 is inserted in the connection between the rectifier 32 and device 34 to suppress the D. C. component of the output voltage and an RC circuit 38 is connected between the cathode of rectifier 32 and ground to eliminate any high frequency ripple by by-passing to ground current of carrier frequency. Amplifying devices could of course be inserted in the output circuit if desired.

With the above described arrangement when there is no signal on the magnetic tape, the magnetic potential of the portions 4 and 6 of element 2 will be the same and hence the flux in each of the lower legs 2*c* and 2*d* will, at any moment, be equal, and in the same direction as indicated by the solid line arrows. The voltages induced thereby in the windings 16*c* and 16*d* will thus be equal and opposite and no voltage will appear across the secondary of transformer 18. When there is a signal on the magnetic tape the portions 4 and 6 are magnetically linked through the core of the head and the tape. The direction, at any moment, of the flux in the lower branches of the element 2 due to the signal on the tape will be in opposite directions as indicated by the dashed lined arrows. Hence, the flux in the branch 2*c* during one-half cycle of the high frequency current will tend to be augmented by the signal flux and that in the branch 2*d* will be reduced. In the next half cycle of the high frequency current the signal flux in the branch 2*c* will oppose the high frequency flux whereas the signal flux in the branch 2*d* will be in a direction tending to augment the high frequency flux.

If the element 2 is driven nearly to, or into, saturation by the exciting voltage, the change in total flux in each branch during the half cycles of the exciting field in which the high frequency and signal fluxes are in opposition will be greater than during the half cycles when the exciting and signal fluxes are in the same direction. Hence the wave form of the total flux in each of the branches 2*c* and 2*d* is unsymmetrical and the voltage induced in the coils 16*c* and 16*d* will have frequency components of both the fundamental and second harmonic of the frequency of the exciting voltage. The components of the fundamental frequency in the coils 16*c* and 16*d* will be substantially equal in amplitude and of opposite phase and hence will not appear across the primary of transformer 18 whereas the components of frequency of the second harmonic will be in phase and of an amplitude corresponding to the intensity of the signal flux.

Figures 3, 4, 5, 6:
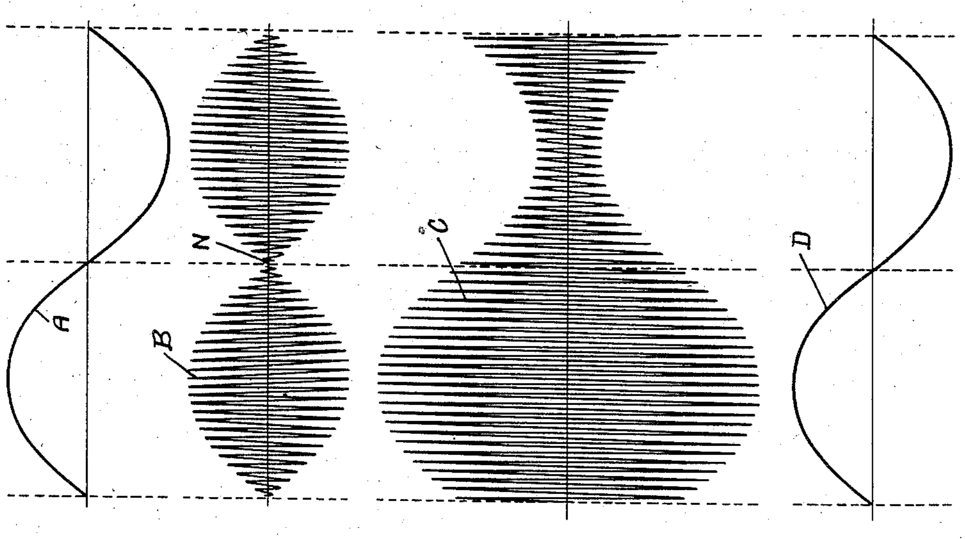
Figs. 3, 4, 5 and 6 are graphs explanatory of the invention.

If the curve A of Fig. 3 represents the signal flux in the head and bridging the gap 8 of the saturable element 2, then the wave form of the voltage appearing across the primary (or secondary) of transformer 18 may be represented by the curve B of Fig. 4, the frequency of which is twice that of oscillator 14. As diagrammatically illustrated in Fig. 4, the amplitude of the wave increases with the signal intensity then decreases to zero at the point N corresponding to the time at which the signal flux reverses in direction and then reverses in phase and increases and decreases in amplitude with the signal intensity during the next half cycle of the signal.

At the mixer tube 24, the voltage from the amplifier 22 of the form of curve B is mixed with voltage of the same frequency (twice that of oscillator 14) and of constant amplitude delivered by the frequency doubler 28. Curve C of Fig. 5 illustrates the voltage wave form after mixing and before rectification when the phase shifter 26 is so adjusted that the high frequency constant voltage is in phase with the induced voltage before reversal thereof, that is, with that part of curve B to the left of point N in Fig. 4. Curve D of Fig. 6 represents the output signal obtained from the mixer output after rectification and suppression of high frequency and direct current components. As is apparent from a comparison of curves A and D the output signal obtained by the above described system corresponds in phase and intensity with the signal flux.

Figure 2:
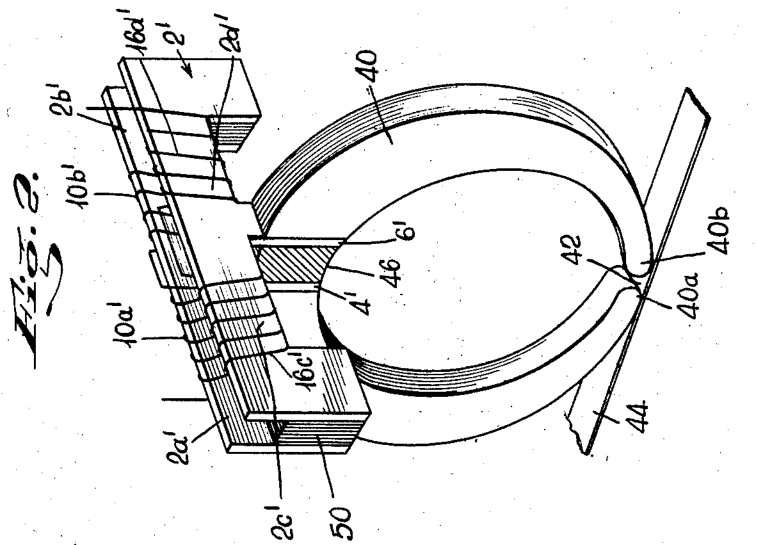
Fig. 2 is a perspective view of a play-back head provided with a saturable element corresponding in function to that diagrammatically shown in Fig. 1.

The physical construction of a play-back head having a saturable element with magnetic paths such as that of the element 2 of Fig. 1 and provided with the exciting and detecting windings shown in Fig. 1 may take various forms. One such form is shown in Fig. 2. In Figs. 1 and 2 like parts are indicated by the same reference numbers, primes being added to the reference numerals in Fig. 2. In Fig. 2 a conventional type laminated core for a reproducing head is indicated at 40 with the pole faces 40*a* and 40*b* thereof separated by a small gap 42 which is bridged by the magnetic signal medium, indicated as magnetic tape 44. In accordance with the invention the core 40 is formed of two parts which are separated to receive therebetween the portions 4′ and 6′ of the saturable element 2′. Preferably a spacer 46 of non-magnetic material is positioned between the portions 4′ and 6′. The correspondence between the element 2′ and the element 2 of Fig. 1 can be readily visualized by considering element 2 as being folded on itself along a horizontal line passing through the gap 8 with the side arms 2*f* severed where folded and laminations 50 of permeable material sandwiched between the severed portions. The detecting coils 16*c*′ and 16*d*′ are wound about the respective branches 2*c*′ and 2*d*′ at opposite sides of the portion 6′ and the exciting coils 10*a*′ and 10*b*′ are wound about the respective branches 2*a*′ and 2*b*′. As the halves of the core 40 engage the portions 4′ and 6′, the magnetic path for the signal flux through the head and bridging the gap 42 can be traced as follows: from pole face 40*a* through one core half, part 4′ of element 2′ then through parallel paths, one including branches 2*a*′ and 2*c*′ and the other including branches 2*b*′ and 2*d*′, to part 6′ and through the other core half to the pole face 40*b*. As described in connection with Fig. 1, the high frequency exciting flux will not penetrate the core 40 to erase the signal as the parts 4′ and 6′ are at the same magnetic potential in the absence of signal flux.

Figure 7:
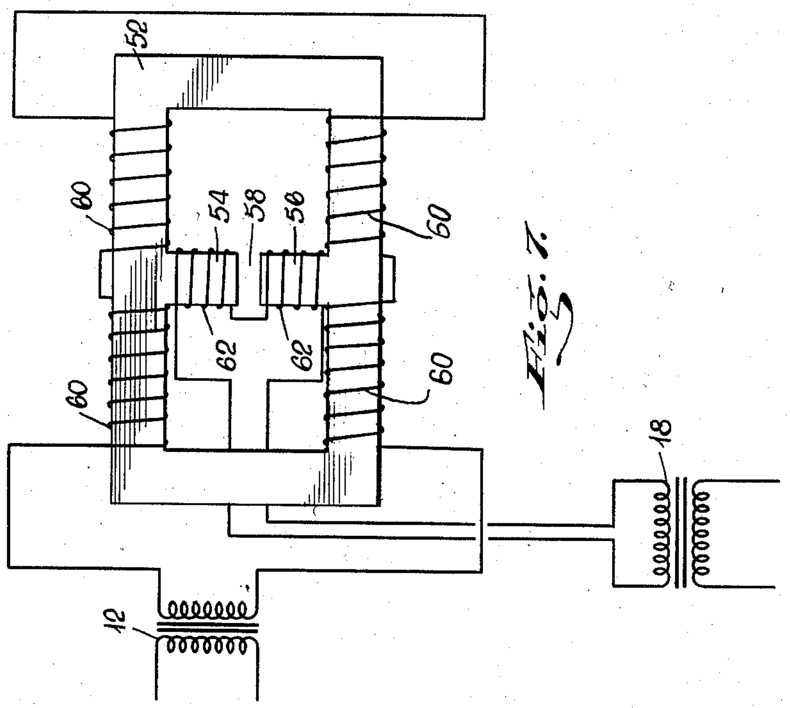
Fig. 7 is a diagram of the type of Fig. 1 but illustrating an alternative construction of play-back head.

Other head constructions embodying the invention will occur to those skilled in the art. For example, the detecting coils could be wound on the core instead of on the branches of the saturable element carrying the exciting flux, or, what is equivalent, could be wound on the portions of the element forming magnetic continuations of the core halves. This latter arrangement is illustrated diagrammatically in Fig. 7 to which reference may now be had. In Fig. 7 a saturable element is shown as in Fig. 1, as comprising a frame 52 having opposed portions 54 and 56 separated by a gap 58 for linkage with the signal flux through a core (not shown). Exciting flux is introduced into the frame 52 by means of a plurality of exciting coils 60, wound in series aiding on the frame 52. Detecting coils 62 are wound in series aiding on the portions 54 and 56. Exciting voltage is applied to the coils 60 from the transformer 12, as in the circuit of Fig. 1, and voltages induced in the detecting windings 62 are impressed across the primary of transformer 18, also as in the circuit of Fig. 1. With the above described circuit, when signal flux is present, a second harmonic of the exciting flux of an amplitude varying with the intensity of the signal flux will be present in the portions 54 and 56 and will induce corresponding voltages in the detecting coils 62 for recovery of the low frequency signal by mixing with energy of the same frequency and subsequent rectification as described in connection with Fig. 1. If the coils 60 are of substantially equal numbers of turns, there will be no flux in the portions 54 and 56 of the frequency of the fundamental and hence only the second harmonic will appear at the output of transformer 18. It will be understood that in an actual head construction the coils 62 could, and preferably would, be wound about the core halves rather than about the portions 54 and 56 in the magnetic path thereof.

The invention has now been described with reference to two specific embodiments thereof. Obviously various changes in the specific constructions and circuits illustrated could be made without departing from the scope of the invention as defined in the accompanying claims.

The following is claimed:

1. The combination comprising a core having pole faces separated by a gap for flux interlinkage with a magnetic signal medium, a magnetically saturable element forming part of the magnetic circuit of the core, exciting coils coupled to the magnetic circuit, a source of high frequency voltage connected across said exciting coils to produce a high frequency flux in said magnetically saturable element, detecting coils coupled to the magnetic circuit for induction therein of voltages varying in magnitude in accordance with the variations in intensity of the magnetically recorded signal and of twice the frequency of said high frequency voltage, an output circuit connected to said detecting coils, a frequency doubler other than that comprising said magnetically saturable element, said frequency doubler being excited by said source, means for mixing a signal from said doubler with a signal component from said detecting coils and rectifier means for converting the output of said mixing means into a signal varying with the intensity of the signal on the signal medium.

2. A device for converting signals magnetically recorded on a magnetizable medium into electrical signals comprising means for establishing a rapidly fluctuating magnetic field in a saturable medium, means for maintaining the intensity of said magnetic field at a level to substantially saturate said medium, means for modulating said field in accordance with variations of magnetic field intensity corresponding to the magnetically recorded signal to provide a resultant fluctuating magnetic field of twice the frequency of said first-named field and varying in amplitude with the intensity of the magnetic signals, means for translating the last-named magnetic fluctuation into fluctuating electrical voltages, means for mixing said fluctuating electrical voltages with a voltage of twice the frequency of said rapidly fluctuating magnetic field, and means for converting the resultant from said mixed voltages into a signal voltage varying with the intensity of the recorded magnetic signal.

3. The combination according to claim 1 including adjustable phase shifting means to shift the phase of the energy delivered by said frequency doubler relative to the phase of the energy delivered by said detecting coils.

4. The combination with apparatus including means for impressing magnetic forces, from a signal magnetically recorded on a magnetizable medium, on a magnetic field created by a high frequency alternating current to produce fluctuating electrical voltages with twice the frequency of said alternating current and varying in peak amplitude with the intensity of the recorded magnetic signal; of means for supplying a fluctuating electrical voltage with twice the frequency of said alternating current and with a substantially constant peak amplitude, means for mixing said first and second named fluctuating electrical voltages, and means for converting the resultant from the mixed voltages into a signal voltage varying with the intensity of the recorded magnetic signal.

References Cited in the file of this patent

UNITED STATES PATENTS

| | | |
|---|---|---|
| 2,351,005 | Camras | June 13, 1944 |
| 2,536,260 | Burns | Jan. 2, 1951 |
| 2,608,621 | Peterson | Aug. 26, 1952 |

FOREIGN PATENTS

| | | |
|---|---|---|
| 70,462 | Norway | May 20, 1946 |